Figure 1:
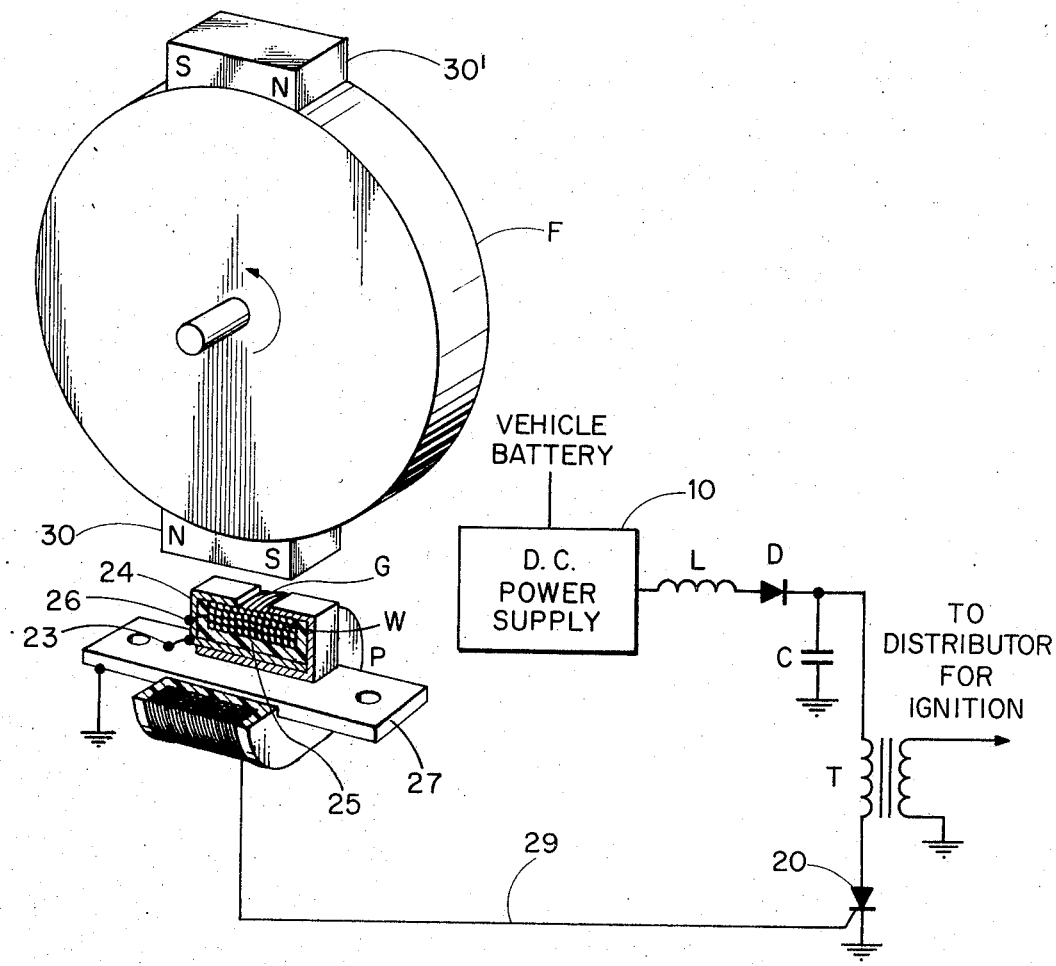

United States Patent
Minks et al.

[11] 3,851,198
[45] Nov. 26, 1974

[54] ELECTRICAL DISCHARGE ADVANCE SYSTEM AND METHOD

[76] Inventors: Floyd M. Minks, Rt. 1, Box 66, Kissimmee, Fla. 32741; Floyd A. Minks, Box 252, Ridgetop, Tenn. 37152

[22] Filed: Sept. 17, 1971

[21] Appl. No.: 181,401

[52] U.S. Cl. ....... 310/70 R, 123/148 E, 123/149 C, 310/70 A, 310/153
[51] Int. Cl. .......................................... H02k 39/00
[58] Field of Search ........ 123/148 E, 149 C, 149 D, 123/149 R, 149 F, 146.5 A; 310/20, 111, 153; 315/209 CD, 209 SC, 209 T

[56] References Cited
UNITED STATES PATENTS

| | | | |
|---|---|---|---|
| 3,495,579 | 2/1970 | Davalillo | 123/149 R |
| 3,515,109 | 6/1970 | Farr | 123/148 E |
| 3,524,438 | 8/1970 | Janisch | 123/148 E |
| 3,598,098 | 8/1971 | Sohner | 123/148 E |
| 3,612,948 | 10/1971 | Minks | 315/209 SC |
| 3,667,441 | 6/1972 | Cavil | 123/149 D |

Primary Examiner—J. D. Miller
Assistant Examiner—Harry E. Moose, Jr.
Attorney, Agent, or Firm—Rines and Rines; Shapiro and Shapiro

[57] ABSTRACT

This disclosure deals with a novel technique and apparatus for advancing electrical discharges such as, for example, in the ignition system of engines and the like, through the generation of a voltage waveform comprising, in part, a pair of similarly poled impulses, one of which is used to initiate the electrical discharge during relatively slow speeds of engine rotation and the other of which controls the initiation of the discharge at relatively high speeds.

4 Claims, 4 Drawing Figures

3,851,198

INVENTORS
FLOYD M. MINKS
FLOYD A. MINKS

BY Rines and Rines

ATTORNEYS

ELECTRICAL DISCHARGE ADVANCE SYSTEM AND METHOD

The present invention relates to the systems and methods for controlling the advance of electrical discharges such as those employed in engine ignition systems and the like.

In the past, spark advance in engines deriving their timing from magnetic pickups has generally been produced in one of three ways. First, the portion of the pickup normally mounted to the non-rotating engine structure has been adjusted, either manually or by centrifugally actuated mechanisms, to advance the spark with engine speed or other changing engine conditions. Secondly, the poles producing the pulse for actuating the ignition system may be so shaped as to provide a gradually rising waveform with time. Thus, if the ignition system is actuated at a fixed voltage, the spark will occur earlier or be advanced as rpm increases, since the output of this magnetic pickup structure is directly proportional to speed. Such a system is described, for example, in U.S. Pat. No. 3,447,521. Among the disadvantages in such systems, are their sensitivity to the spacing between the parts and small dimensional changes in the same and in the magnetics. Where a relatively large-diameter rotating member is involved, moreover, the parts to be mounted thereon generally become unreasonably large. If a small-diameter member is used that enables the use of smaller parts, however, it is often difficult to get sufficient output at low rpm, as during cranking.

A third approach has involved the use of two separate magnetic structures, such as steel pins of different lengths attached to the rotating member, as initially employed, for example, in the Kiekhaefer Mercury snowmobiles of 1967. This technique provides a jump or discontinuity in the spark advance curve at a preselected rpm, such as between cranking and idling and the useful rpm range of the engine. Such a construction is, however, subject to the disadvantage that two separate parts must be used, that the dimensions or gaps between these parts are critical, and that in such structures, the magnetic circuit is relatively inefficient in view of the large return air gap.

An object of the invention, thus, is to provide a new and improved method of and system for enabling electrical discharge advance, such as spark advance in ignition systems and the like, that shall not be subject to the above-described limitations and disadvantages but that, to the contrary, enables spark advance without the critical variation of performance, and with small and inexpensive parts.

An additional object is to provide a novel electrical discharge-initiating system of more general applicability, as well.

Other and further objects will be explained hereinafter and are more particularly pointed out in the appended claims. In summary, however, from one of its aspects, the invention contemplates using a specially generated waveform, having a first small impulse and a second large impulse generated in response to the passage of a magnetic field carried by a flywheel past a voltage induction zone, to cause the large impulse to initiate the electrical discharge of stored energy during relatively low rotational speeds of the flywheel, as in cranking, and to enable the smaller impulse to control the initiation of the discharge at the higher running speeds. Preferred constructional details are hereinafter set forth.

Figure 1A:
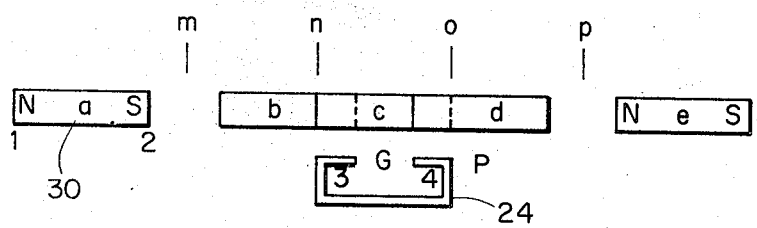
Figure 2:
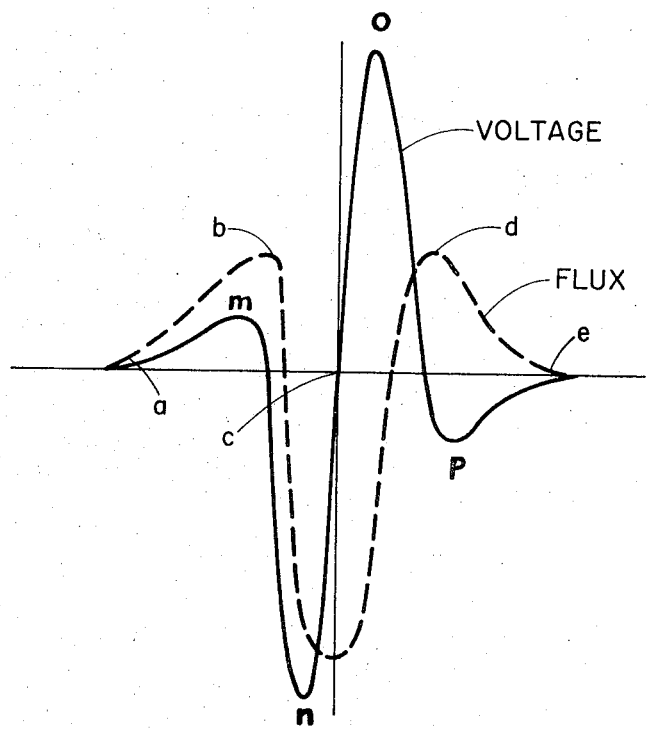
Figure 3:
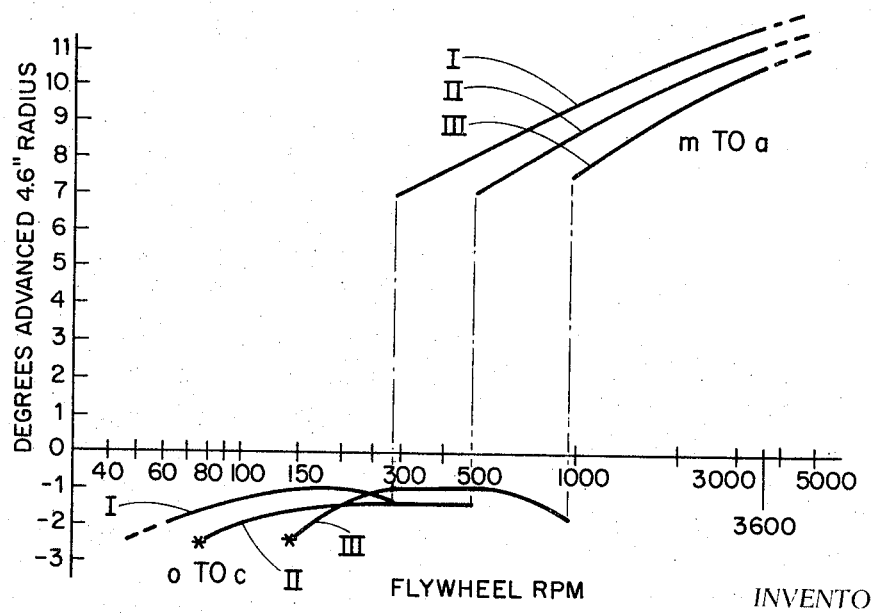

The invention will now be described with reference to the accompanying drawing,

FIG. 1 of which is a combined schematic circuit diagram and fragmentary isometric illustrating, in simplified form, a preferred embodiment of the invention adapted to the exemplary case of an engine ignition system for a vehicle or the like;

FIG. 1A is a diagram illustrating the various positions of the moving magnetic-field-producing structure and the pickup of FIG. 1;

FIG. 2 is a graph illustrating voltage and magnetic flux waveforms involved in the operation of the structure of FIG. 1; and FIG. 3 is a further graph plotting the degrees of advance produced in actual ignition systems (operating in accordance with the invention) as a function of the flywheel speed, for different spacings between the pickup that is producing the induced voltage and the magnetic-field-producing device carried by the flywheel, and demonstrating the relative independence of the operation upon gap spacing, and the substantial advance range achievable in one region in response to the higher engine speeds, the discharge of which is controlled by the before-mentioned first impulse, and the relatively small range of degree advance produced in response to the before-mentioned second impulse.

Referring to the drawings and particularly the embodiment of FIG. 1, a typical energy storage system is illustrated, such as used in vehicle systems and the like, having a DC power supply 10 for periodically charging or storing energy in one or more storage capacitors through a series-resonant circuit embodying an inductance L and a check valve D. The stored energy in capacitor C is ready for discharge and application via an ignition transformer T to the spark plugs, through a distributor (if used) to enable ignition, under the control of a trigger or discharge-initiating device, illustrated as a solid-state silicon-controlled rectifier switch 20. The trigger or discharge-initiating switch 20 is controlled through the medium of pickup device P, shown in preferred construction as embodying a U-shaped magnetic pickup member 24 having an open upper intermediate gap G and internally carrying a pickup coil W wound within an insulating bobbin 25. In this construction, a conducting mounting plate 27 is passed through a transverse slot in the bobbin 25 to establish a connection to ground for the pickup housing for one end of the winding W, at 26. The other end of the pickup winding W is connected at 29 to the trigger gate of electronic switch 20. Thus, voltage impulses induced in the winding W of the pickup P may be caused, if of sufficient amplitude, to trigger the switch 20 and thus to effect the discharge of the energy stored in the capacitor C through the ignition transformer T, producing an output pulse for energizing the spark gap or other load.

The particular embodiment of FIG. 1 is especially adapted, for example, for a two-cylinder engine, employing similarly poled permanent magnets 30 and 30' positioned at diametrically opposite regions of the flywheel F that is driven by the engine through the zone at which the pickup element P has been disposed. In this construction, it is preferred, though not essential, that the dimensions of the magnets along the periphery of the flywheel F be made to correspond substantially to the upper dimension of the magnetic pickup P for reasons that will later be made evident. The space between the north and south poles N and S of the magnets 30 and 30' is thus made to correspond essentially to the space between the pole pieces on opposite sides of the gap G.

FIG. 1A shows the pickup P with the magnet 30 at different successive locations a, b, c, d and e, as the magnet rotates past the zone containing the pickup P; and illustrates the flux and voltage waveforms resulting from this movement of the magnet past the pickup P. The magnet 30 is shown in position a of FIG. 1A as having a pole 1 and a pole 2, corresponding, as before-mentioned, essentially to the spacing of the two pole pieces of the pickup P at 3 and 4. The flux waveform that is produced will first be described.

With the magnet 30 at its left-most position a, a small amount of flux will pass from pole 2 of the magnet 30 to region 3 of the pickup coil, and thence to the coil region 4 and through the air back to pole 1 of the magnet 30. This flux will increase, reaching a maximum with the magnet 30 in the position b where pole 2 is aligned directly above region 3. The amplitude of this flux will be relatively low because the return path from region 3 to pole 1 of the magnet is through the air. As the magnet 30 moves to the position c, the flux will rapidly change to the opposite polarity, reaching a much higher amplitude maximum with magnet pole 1 aligned with region 3. The flux amplitudes and directions at positions d and e will correspond to those previously described for positions b and a. The voltage waveform, however, as is well known, is derived by differentiating the flux waveform with respect to time. It will consist of a relatively small leading pulse m, FIG. 2, defined as polarity plus, with its peak value occurring when the magnet is between positions a and b, followed by a much higher amplitude negative pulse n peaking when the magnet 30 is between positions b and c, followed by a similar high amplitude positive pulse o peaking when the magnet is between positions c and d, and, terminating with a low amplitude negative pulse p peaking when the magnet 30 is between positions d and e. If the pickup P is operated essentially open circuit, the amplitudes of all portions of the waveform will increase essentially linearly with engine rpm.

While I have before proposed to establish alternate firing of two spark plugs from a single pickup in a two-cylinder engine or to prevent reverse running of a two-cycle engine ignition system with similarly generated waveforms, the waveforms are here especially retailored and differently employed in accordance with the present invention to make novel use of two of the impulse regions thereof for the different purposes of the present invention. In such previous applications, indeed, it has been considered necessary to produce an initial impulse m that, unlike in FIG. 2, is of negligible amplitude such that it does not affect the operation of those systems. This, however, is the exact opposite of what is done in connection with the different usage of the present invention. Specifically, it is desired, in accordance with the invention, to adjust the resulting voltage waveform impulse portion m, FIG. 2, such that it may be utilized as the triggering impulse at the high rotational speeds of the flywheel. The parameters of the components are so adjusted that the amplitude of the initial voltage peak m occurring between positions a and b corresponds to the level required to fire the ignition system at the rpm where the discontinuity in spark advance characteristics is required. Thus, below this rpm, this initial pulse m is of such low amplitude as not to produce a spark; and the spark is then produced by the waveform pulse o produced between positions c and d. Thus, at very low speed, the spark will occur at a position near o, FIGS. 1A, and 2. As speed increases slightly, the spark firing point will move toward region c; and as speed increases further, the amplitude will increase to point m sufficiently to trigger the ignition system, and the timing curve will have a discontinuity with the timing point jumping to point m. As speed increases further, spark advances will increase slightly in the direction of region a. This is shown in the Degrees Advanced-Flywheel RPM experimental graphs of FIG. 3, with the discontinuity illustrated by the vertical dashes between characteristic curves I—I, II—II and III—III, plotted respectively for magnetic-to-pickup spacings of 0.021, 0.056 and 0.125 inch and using an aluminum flywheel F. In most practical constructions, the advance from region o toward region c can be considered negligible. The additional advance from position m up to the maximum in engine rpm may be made relatively small, as shown, or it can be made considerably larger by adjusting the shape of the poles or by, for instance, mounting the magnets on a steel flywheel instead of aluminum. It will be observed that a change in the spacing between the magnet and pickup over a range of five to one corresponded to less than a 2° change in timing at an operating speed of the engine of 3,600 rpm, compared to a total overall spark advance of 15°.

There are occasions, however, as in the case of snowmobiles and the like, where a wider range of variation of advance of spark is desired and where somewhat different shaping of the characteristic curve and positioning of the discontinuity therein is useful. For instance, if a steel flywheel is used with the base of a magnet mounted upon it, the portion of the curve up to the discontinuity and the discontinuity itself will remain almost unchanged; but the spark advance from the discontinuity up to the maximum engine operating rpm rather than being approximately 4°, FIG. 3, could well become two or three times that value. Thus, the discontinuity could give the initial retarding of spark desirable for hand cranking these engines, and the additional advance could provide more efficient operation of the engine over its load speed range, if desired.

Further modifications will also occur to those skilled in this art, and all such are considered to fall within the spirit and scope of the invention as set forth in the following claims.

What is claimed is:

1. A system for controlling the timing of the spark ignition of an internal combustion engine, said system comprising means for producing an ignition voltage at a sparkplug in response to an input voltage of predetermined amplitude and polarity, and means for producing said input voltage, the last-mentioned means comprising means for producing a magnetic field, magnetic pickup means, means for varying the coupling of said field and said pickup means repetitively in synchronism with the operation of the engine such that the flux waveform through said pickup means comprises a first portion increasing gradually from zero in a first direction followed by a second portion of much greater amplitude in the opposite direction, followed by a third portion of substantially the same amplitude and direction as the first-mentioned portion, said flux waveform producing at the output of said pickup means a voltage waveform comprising a first portion of a first polarity gradually increasing from zero, followed by a second portion of much greater amplitude and of the opposite polarity, followed by a third portion of substantially the last-mentioned amplitude and of the first polarity, followed by a fourth portion of the said opposite polarity and of amplitude substantialy the same as the first-mentioned voltage waveform portion, said first polarity of said voltage waveform being said predetermined polarity, the amplitude of said first portion of said voltage waveform being less than said predetermined amplitude below a predetermined engine speed at which discontinuous spark advance is desired and being at least as great as said predetermined amplitude above said predetermined engine speed, and the amplitude of said third portion of said voltage waveform being at least as great as said predetermined amplitude below said predetermined engine speed, whereby said third portion of said voltage waveform activates the production of said ignition voltage below said predetermined engine speed and said first portion of said voltage waveform activates the production of said ignition voltage above said predetermined engine speed.

2. A system as claimed in claim 1, wherein said first and fourth portions of said voltage waveform have substantially the same shape and wherein said second and third portions of said voltage voltage waveform have substantially the same shape.

3. A system as claimed in claim 1, wherein the speed of said engine below said predetermined speed corresponds to the cranking of the engine and the speed of said engine above said predetermined speed corresponds to the running of the engine.

4. A system as claimed in claim 1, wherein said means for varying the coupling of said field and said pickup means comprises a rotor carrying said magnetic-field-producing means past said pickup means, said magnetic-field-producing means comprises a magnet having a magnetic axis substantially parallel to a tangent of the rotor, and said pickup means comprises a pair of spaced pole pieces defining a magnetic axis substantially parallel to the magnetic axis of said magnet when said magnet is substantially centered with respect to said pole pieces.

* * * * *